(12) United States Patent
Hertzberg

(10) Patent No.: US 9,155,430 B2
(45) Date of Patent: Oct. 13, 2015

(54) ULTRASOUND SYSTEM AND METHOD FOR DEICING AND DEFROSTING

(76) Inventor: Yoni Hertzberg, Ben-Shemen (IL)

( * ) Notice: Subject to any disclaimer, the term of this patent is extended or adjusted under 35 U.S.C. 154(b) by 411 days.

(21) Appl. No.: 13/817,460

(22) PCT Filed: Aug. 14, 2011

(86) PCT No.: PCT/IL2011/000659
§ 371 (c)(1),
(2), (4) Date: Feb. 18, 2013

(87) PCT Pub. No.: WO2012/029056
PCT Pub. Date: Mar. 8, 2012

(65) Prior Publication Data
US 2013/0146093 A1    Jun. 13, 2013

Related U.S. Application Data

(60) Provisional application No. 61/378,493, filed on Aug. 31, 2010.

(51) Int. Cl.
*A47L 1/16*      (2006.01)
*B60S 1/00*      (2006.01)
*B60S 1/02*      (2006.01)
*B64D 15/00*    (2006.01)
*B64D 15/20*    (2006.01)

(52) U.S. Cl.
CPC ... *A47L 1/16* (2013.01); *B60S 1/00* (2013.01);
*B60S 1/02* (2013.01); *B60S 1/023* (2013.01);
*B60S 1/026* (2013.01); *B64D 15/00* (2013.01);
*B64D 15/20* (2013.01)

(58) Field of Classification Search
CPC .......... B64D 15/00; B64D 15/20; B60S 1/00;
B60S 1/02; B60S 1/023; B60S 1/026; A47L 1/15
See application file for complete search history.

(56) References Cited

U.S. PATENT DOCUMENTS

| | | |
|---|---|---|
| 5,496,989 A | 3/1996 | Bradford et al. |
| 6,870,139 B2 | 3/2005 | Petrenko |
| 2001/0041880 A1 | 11/2001 | Brisken et al. |
| 2009/0224104 A1* | 9/2009 | Tenebre et al. ........... 244/134 R |
| 2010/0031972 A1* | 2/2010 | Royer et al. ...................... 134/1 |
| 2013/0032671 A1* | 2/2013 | Giles et al. ................ 244/134 R |

OTHER PUBLICATIONS

International Search Report of PCT/IL2011/000659.

* cited by examiner

*Primary Examiner* — Saeed T Chaudhry
(74) *Attorney, Agent, or Firm* — The Law Office of Joseph L. Felber

(57) ABSTRACT

According to the present invention there are provided an ultrasound system and method for glass deicing and defrosting, particularly of car's windshields. The system includes cube-shaped ultrasound transducers which generate high-intensity ultrasound waves which propagate in the windshields and heat it uniformly. Selection of the working parameters of the system is performed for specific windshields by a method including simulations.

6 Claims, 8 Drawing Sheets

ULTRASOUND SYSTEM AND METHOD FOR DEICING AND DEFROSTING

CROSS-REFERENCE TO RELATED APPLICATION

This application claims priority from PCT application No. PCT/IL2011/000659, filed Aug. 14, 2011, which claims priority from U.S. Provisional Patent Application No. 61/378,493, filed Aug. 31, 2010, both of which are incorporated by reference in their entirety herein.

FIELD OF THE INVENTION

The present invention relates to deicing and defrosting system, particularly, to an ultrasound system for deicing and defrosting, and more particularly, to an ultrasound system and method for car glass windshield deicing and defrosting.

BACKGROUND OF THE INVENTION

Ice and frost formation on windows creates severe limitations in peoples' daily lives. Such formation on building windows limits and sometimes blocks visibility through the windows, which may be critical in the cases of observation points and military lookout posts. The problem of ice and frost formation has a severe effect on safety when it appears on windows and mirrors of vehicles such as cars, truck, boats, airplanes, etc.

There is a clear need to prevent the formation of ice and frost on surfaces, and especially on windows at specific times and there is a need to enable the removal of ice and frost in such cases that the formation of ice and frost was not prevented, when ice and frost free surfaces are required.

Since the first time people started using windows, devices, systems and methods began to develop in order to address the problem of ice and frost formation. These are based among other things on mechanical removal of the ice and frost by means of wipers, brushes or other tools, by mechanical removal using air flow, heating by means of electrical conductors glued to the windows and defrosting using a vehicle's air conditioning systems.

Due to the limitations inherent to these systems and methods, systems for vibrating of windows by means of ultra sonic waves transducers were introduced, for hampering of ice formation. The transducer converts an electronic drive signal into mechanical vibrations, resulting in the emission of acoustic waves.

Ultrasound (i.e., acoustic waves having a frequency greater than about 20 kilohertz), is widely used in many industrial, military and medical applications. Some examples are medical diagnostics, underwater sonar imaging, cleaning, medical therapeutic, welding and bonding applications. The last three examples utilize heating effect of ultrasound. The acoustical energy of the mechanical stress waves propagating in a medium is transformed to heat due to absorption along the acoustic propagation path.

In contrast to the liquids, sound wave propagation in solids is carried out by longitudinal waves, which are also referred to as primary waves and P-waves, and secondary waves, which are also referred to as shears waves and S-waves.

In addition, thin solid sheets like glass windows act like waveguides and mix longitudinal and shear wave components and produce a variety of vibration modes.

However, it is not enough to attach an ultrasonic transducer to a window in order to prevent formation of ice and frost on a window as well as removing them based on the power sources available to such transducers on one hand and the required rate of de-icing on the other hand, for example.

In order to achieve results that will enable a substantial improvement over the existing systems' and methods' performance, for example, in de-icing the outer side of a vehicle windshield and preventing the accumulation of frost on the inner side of the windshield, thus providing safe conditions for driving within a short time from starting the car engine, the present invention suggests an optimization method which enables the selection of the ultrasonic transducers, the working frequencies, the transmission power, the locations and ways of attaching the ultrasonic transducers to the vehicle's windshield, for providing a windshield high-intensity heating system.

Such optimization is possible when specific required parameters of the vehicle's windshield are known and each parameter's influence on the system's components on the result is understood.

A window ice formation hampering apparatus is described in PCT patent application No. PCT/US2000/012915 of Lenhardt. Lenhardt describes a vehicle ice formation hampering system utilizes at least one ultrasound frequency to retard the formation of ice or frost on a window of the vehicle, which is incorporated by reference for all purposes as if fully set forth herein.

FIG. 1 of the prior art illustrates an ice formation hampering system according to the invention of Lenhardt.

Two ultrasonic transducers (or vibrators) 20 are coupled to a window of the car, for example, the front flat windshield 31.

Amongst other possibilities, the ultrasonic transducers 20 may be piezoelectric devices.

According to Lenhardt when the ultrasonic transducers 20 vibrate the flat windshield 31 hampering of ice formation is achieved.

The prior art systems and methods do provide a hampering only solution but do not provide a good solution for clearing a defrosted or deiced windshield and do not provide a solution to the need for adjusting the system to varying parameters of different kinds of vehicle windshields.

There is therefore a need for a system for deicing and defrosting, that will improve the known performances and that would fit best for varying types of vehicle windshields.

SUMMARY OF THE INVENTION

The background art does not teach or suggest an ultrasound system and method for glass deicing and defrosting, but provides ice formation hampering based on ultrasonic vibrations of the window. The present invention provides defrosting and deicing system and method by producing heat using high-intensity ultrasound waves propagating inside the glass.

The present invention overcomes these deficiencies of the background art by providing an ultrasound system and method for glass deicing and defrosting that provide a good solution to the need for adjusting the system to varying parameters of different kinds of vehicle windshields.

According to the present invention there is provided a deicing and defrosting ultrasound system for deicing and defrosting ice from a windshield, wherein the windshield has windshield side edges and two windshield side faces, the system includes: (a) at least one ultrasonic transducer assembled onto the windshield side edges; and (b) at least one alternating current (AC) power supply, wherein each one of the ultrasonic transducer is operatively connected to one of the power supplies, wherein there is a power generated from all of the ultrasound transducers wherein the power is at least 100 watt for every windshield square meter area.

According to further features in described embodiments of the each one of the at least one ultrasound transducer is a cube-shaped ultrasound transducer.

According to still further features in the described embodiment each one of the cube-shaped ultrasound transducer includes: (i) an ultrasound transducer body having six ultrasound transducer body side edges; and (ii) two ultrasound transducer external layer disposed on two opposite sides of the ultrasound transducer body side edges.

According to still further features in the described embodiment the ultrasound transducer body is composed of ceramic material and wherein the ultrasound transducer external layer is composed of an electrically conductive material.

According to still further features in the described embodiment each one of the cube-shaped ultrasound transducer is assembled onto the windshield side edges such that one ultrasound transducer body side edge, which is not coated with the ultrasound transducer external layer, faces to one of the windshield side edges.

According to still further features in the described embodiment, the ultrasound transducer is built into said windshield's structure.

According to the present invention there is provided a method for selecting work parameters of a deicing and defrosting ultrasound system, the method including the stages of: (a) selecting initial work parameters of a cube-shaped ultrasound transducer, and of a frequency; (b) performing simulation; (c) receiving results; (d) changing work parameters; (e) asking if the result satisfied and receiving an answer; (f) if the answer is 'no', returning to the stage of performing simulation; (g) if the answer is 'yes', presiding to stage ending the work parameters selecting of one cube-shaped ultrasound transducer and frequency; and (h) completing the selection of work parameters of one cube-shaped ultrasound transducer and frequency.

According to the present invention there is provided a method for selecting distance between two neighboring cube-shaped ultrasound transducers of a deicing and defrosting ultrasound system, the method including the stages of: (a) selecting initial distance between two neighboring cube-shaped ultrasound; (b) performing simulation; (c) receiving results; (d) changing the distance; (e) asking if the result satisfied and receiving an answer; (f) if the answer is 'no', returning to stage of performing simulation, and if the answer is 'yes', presiding to stage of ending the distance selecting between two neighboring cube-shaped ultrasound transducers selecting; and (g) ending the selection of distance between two neighboring cube-shaped ultrasound transducers selecting.

According to the present invention there is provided a method for deicing a windshield, the method including the stages of: (a) transmitting ultrasound waves from ultrasound transducers of a deicing and defrosting ultrasound system to the windshield, through a windshield side edge; and (b) propagating the ultrasound waves inside the windshield, wherein there is a windshield temperature raising rate of at least five degrees per every five minutes.

According to further features in the described method, the deicing and defrosting ultrasound system includes: (i) at least one cube-shaped ultrasound transducer assembled onto the windshield side edges, having an ultrasound transducer body having six ultrasound transducer body side edges; and two ultrasound transducer external layers disposed on two opposite sides of the ultrasound transducer body side edges.

According to still further features in the described method the deicing and defrosting ultrasound system further includes: (ii) at least one alternating current (AC) power supply, wherein each one of the cube-shaped ultrasonic transducer is operatively connected to one of the power supplies, wherein there is power generated from all of the ultrasound transducers wherein the power is at least 100 watt for every windshield square meter area, wherein the ultrasound transducer body is composed of ceramic material and wherein the ultrasound transducer external layer is composed of an electrically conductive material, wherein each one of the cube-shaped ultrasound transducers is assembled onto the windshield side edges such that one ultrasound transducer body side edge which is not coated with the ultrasound transducer external layer faces one of the windshield side edges.

Additional objects and advantages of the invention will be set forth in part in the description which follows and, in part, will be obvious from the description, or may be learned by practice of the invention.

BRIEF DESCRIPTION OF THE DRAWINGS

The invention is herein described, by way of example only, with reference to the accompanying drawings, wherein.

DETAILED DESCRIPTION OF EMBODIMENTS

Figure 1:
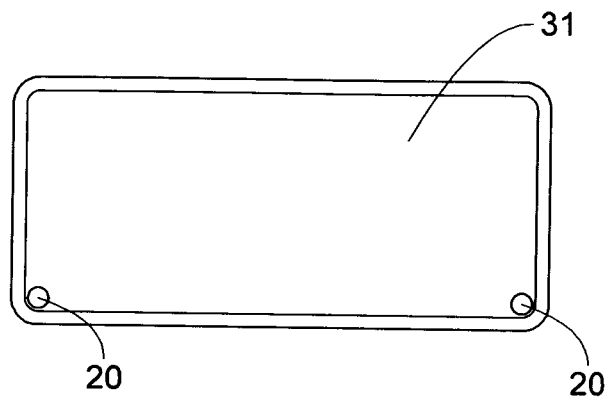
FIG. 1 of the prior art illustrates an ice formation hampering system.

The present invention is of an ultrasound system and method for glass deicing and defrosting.

The principles and operation of an ultrasound system and method for glass deicing and defrosting according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

Figure 2:
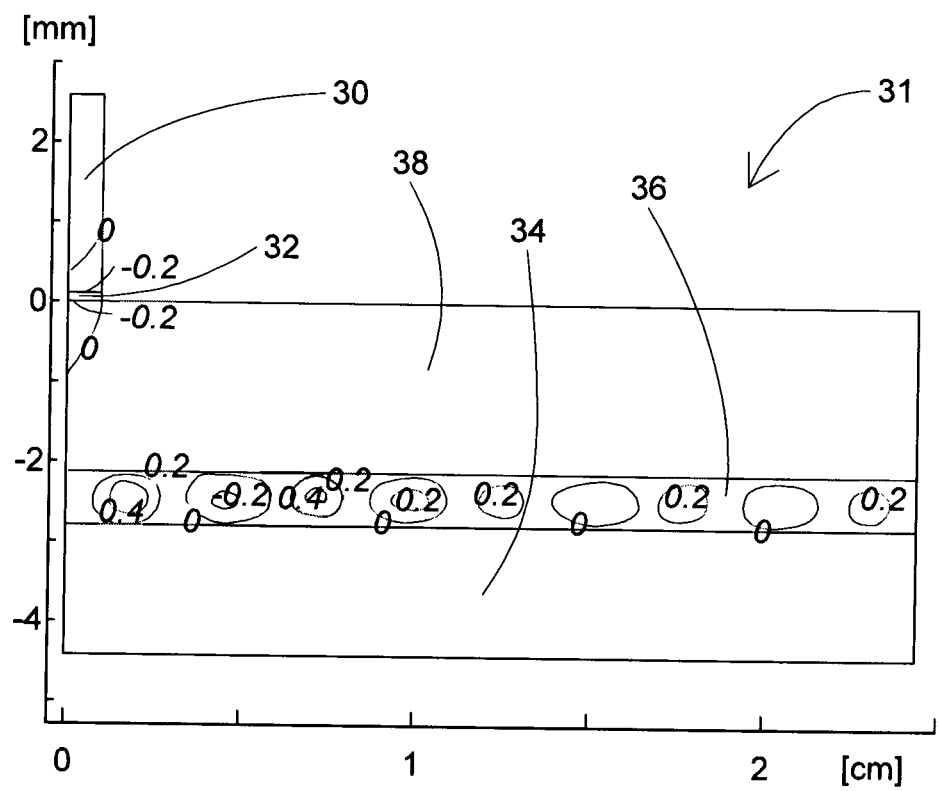
FIG. 2 is a schematic illustration of a two-dimensional (2D) acoustic simulation of ultrasonic waves inside a windshield produced by a cube-shaped ultrasound transducer, according to the present invention.

The following list is a legend of the numbering of the application illustrations:
1 deicing and defrosting ultrasound system
20 ultrasonic transducer
30 cube-shaped ultrasound transducer
30a ultrasound transducer external layer
30b ultrasound transducer body
30c ultrasound transducer body side edge
30d ultrasound transducer center
30e distance (between two neighboring cube-shaped ultrasound transducer)
31 flat windshield
31a windshield side edge
31ab windshield bottom side edge
31b windshield side face
31c windshield square meter area
32 epoxy glue
33 curved windshield
34 first glass sheet
36 Polyvinyl Butyral (PVB) layer
38 second glass sheet
40 simulated impedance
42 measured impedance
50 alternating current (AC) power supply
52 electrical conductor
53 heat sensor
54 wire
55 container
56 liquid
60 ultrasonic wave
DT windshield temperature raising rate
F frequency
P ultrasound transducer polarization direction
T temperature
L1 windshield width
L2 windshield height
L3 windshield thickness
S1 transducer depth
S2 transducer height
S3 transducer width
S4 ultrasound transducer external layer thickness
W power Referring now to the drawings, FIG. 2 is a schematic illustration of a two-dimensional (2D) acoustic simulation of ultrasonic waves 60, (not shown in the present drawing), inside a windshield 31 produced by a cube-shaped ultrasound transducer 30, according to the present invention.

The simulation calculates the vibrations within a system of bodies according to each component's acoustic characteristics and properties. In the present figure, the simulation includes four materials: glass, Polyvinyl Butyral (PVB) polymer, epoxy glue and ceramic (of which a cube-shaped ultrasound transducer 30 is made).

The values used in the simulation are those of the commercially available ceramic "Pz26" made by FerroPerm.

Table 1 summarizes the acoustic properties of the different materials used in the simulation.

It should be noted that the materials, properties and figures used herein after are exemplary only and may be substituted by other materials and properties as required by various applications.

TABLE 1

| Name | Description | Material | Units | Value |
|---|---|---|---|---|
| Young Modulus | Elasticity coefficient | Glass | Pascal[Pa] $\left[\frac{N}{m^2}\right]$ | 7.43e+10 |
| Poisson Ratio | Longitudinal to lateral compression ration | Glass | No units | 0.218 |
| D | Density | Glass | $\left[\frac{Kg}{m^3}\right]$ | 2490 |
| Loss Factor | Uniform Loss Factor | Glass | [1/cm/Mhz] | 0 |
| Young Modulus | Elasticity coefficient | Polymer | Pascal[Pa] $\left[\frac{N}{m^2}\right]$ | 1.46e+9 |
| Poisson Ratio | Longitudinal to lateral compression ration | Polymer | No units | 0.42 |
| D | Density | Polymer | $\left[\frac{Kg}{m^3}\right]$ | 1110 |
| Loss Factor | Uniform Loss Factor | Polymer | [1/cm/Mhz] | 0.3 |
| Young Modulus | Elasticity coefficient | Epoxy | Pascal[Pa] $\left[\frac{N}{m^2}\right]$ | 2e+10 |
| Poisson Ratio | Longitudinal to lateral compression ration | Epoxy | No units | 0.333 |
| D | Density | Epoxy | $\left[\frac{Kg}{m^3}\right]$ | 1110 |
| Loss Factor | Uniform Loss Factor | Epoxy | [1/cm/Mhz] | 0.3 |

In the present figure, the simulation assumed a flat windshield 31 rather than a curved windshield 33 to enable a simpler two-dimensional (2D) simulation rather than a more complicated three-dimensional (3D) simulation. A 3D simulation can be done but would require more computational resources.

The flat windshield 31 used in the simulation consisted of three layers: a first glass sheet 34, a Polyvinyl Butyral (PVB) layer 36 and a second glass sheet 38 with width of 1.62 mm, 0.65 mm and 2.13 mm respectively which are indicative to Volkswagen Golf windshields manufactured between 1999 and 2004. The width of the epoxy glue 32 is 100 μm.

In the simulation, a cube-shaped ultrasound transducer 30 is vibrating at a frequency of 460 kilohertz which yields uniform vibrations across the first glass sheet 34 and the second glass sheet 36.

The illustration is marked with lines labeled with values indicating vibrations with equal maximum amplitude. The values are in units of $10^{-6}$ m.

Figure 3:
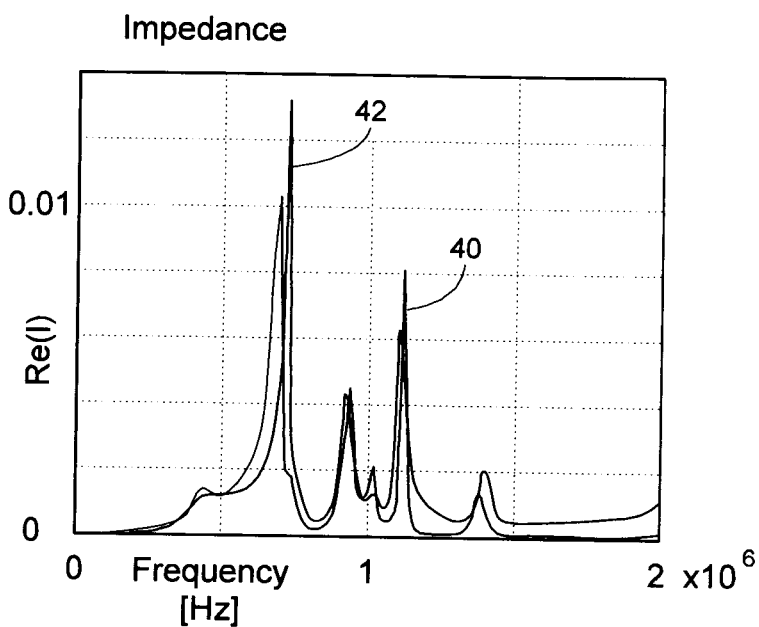
FIG. 3 is a graph of the electrical resistance component of the electrical impedance simulated and measured for the piezoceramic transducer attached to a windshield as described in FIG. 2, according to the present invention.

FIG. 3 is a graph of the electrical resistance component of the electrical impedance simulated 40 and measured 42 for the piezoceramic transducer attached to the a windshield as described in FIG. 2, according to the present invention.

In order to corroborate the calculated model of the simulation depicted in FIG. 2, it is possible to compare the simulated impedance 40 and the measured impedance 42 of the flat windshield 31, (not shown in the present drawing). The good match between the simulated impedance 40 and the measured impedance 42 shows that the simulations yield good, predictable results. Sharp changes in the impedance graph indicate to resonance of the cube-shaped ultrasound transducer 30 (not shown in the present drawing), with poor coupling to the flat windshield 31, which leads to localized heating of the cube-shaped ultrasound transducer 30 without transfer of the vibrations to the flat windshield 31.

On the other hand, a high impedance in a flat region in the impedance spectrum (for example in the 0.46 megahertz region of the spectrum depicted in FIG. 3) is indicative of vibrations with good coupling between the cube-shaped ultrasound transducer 30 and the flat windshield 31.

Figure 4:
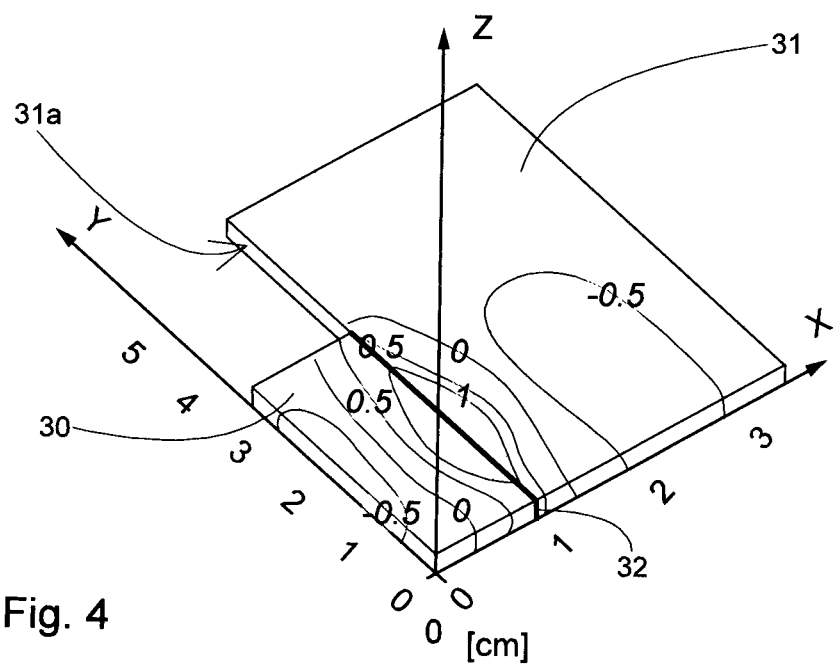
FIG. 4 is a schematic illustration of a three-dimensional (3D) acoustic simulation of ultrasonic waves inside a flat windshield produced by a cube-shaped ultrasound transducer attached to the windshield side edge, according to the present invention.

FIG. 4 is a schematic illustration of a 3D acoustic simulation of ultrasonic waves inside a flat windshield 31 produced by a cube-shaped ultrasound transducer 30 attached to the windshield side edge 31a, according to the present invention.

In the present drawing, the flat windshield 31 and the cube-shaped ultrasound transducer 30 are placed on the X-Y plane of a Cartesian X, Y, and Z axis system.

In the present figure, a cube-shaped ultrasound transducer 30 with a cross-section of 10 mm/35 mm, in a X-Y plan, is attached to flat windshield 31 using epoxy glue 32 with a thickness of 0.1 mm.

The simulation results show that using the simulated frequency of 130 kilohertz, a uniform spread of ultrasonic waves 60, (not shown in the present drawing), is propagated to the center of the flat windshield 31.

The illustration is marked with lines labeled with values indicating vibrations with equal maximum amplitude. The values are in units of $10^{-6}$ meters.

Figure 5:
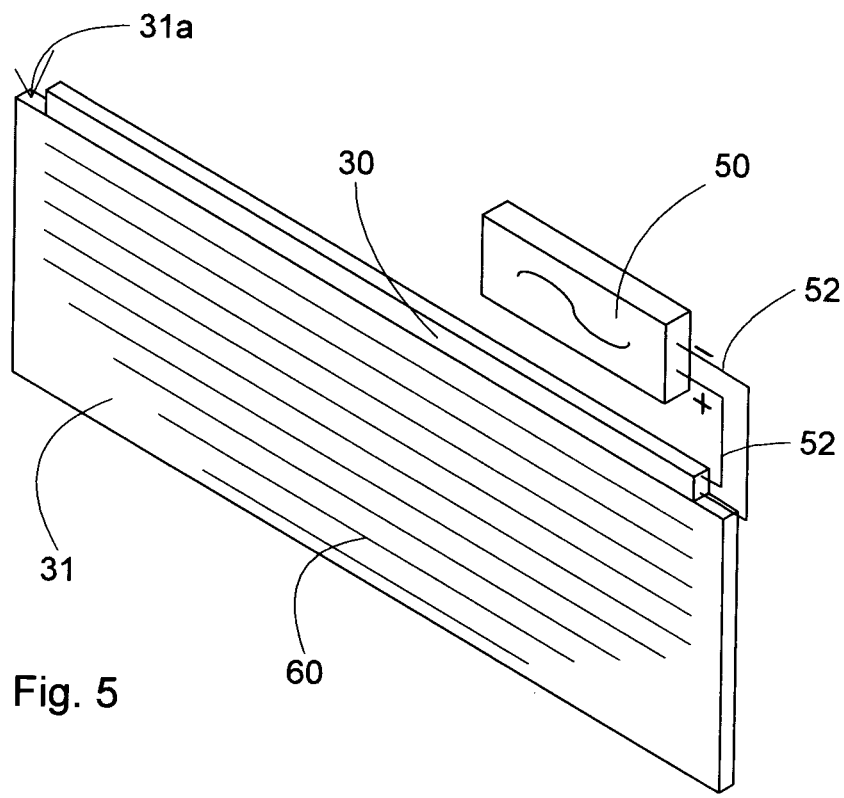
FIG. 5 is an isometric view schematic illustration of an exemplary cube-shaped ultrasound transducer attached to a windshield side edge, according to the present invention.

FIG. 5 is an isometric view schematic illustration of an exemplary cube-shaped ultrasound transducer 30 attached a windshield side edge 31a, according to the present invention.

The cube-shaped ultrasound transducer 30 connects to an alternating current (AC) power supply 50 using at least two electrical conductors 52. The AC power supply 50 generates alternating current (and voltage) that is transferred to the cube-shaped ultrasound transducer 30 via the electrical conductors 52. Since the cube-shaped ultrasound transducer 30 is made of a piezoelectric material it begins to vibrate at the frequency of the alternating current generated by the AC power supply 50. These vibrations are transferred into the flat windshield 31 to generate ultrasonic waves 60 within the flat windshield 31.

The ultrasonic waves 60 propagate within the flat windshield 31 according to its acoustic structural properties, are absorbed due to its ultrasound absorption coefficient and when absorbed in the glass, generate the heat required to deice or defrost the flat windshield 31.

The present figure depicts only one cube-shaped ultrasound transducer 30 for simplicity reasons, but there may be more than one cube-shaped ultrasound transducer 30 connected to more than one AC power supply 50.

Figure 6:
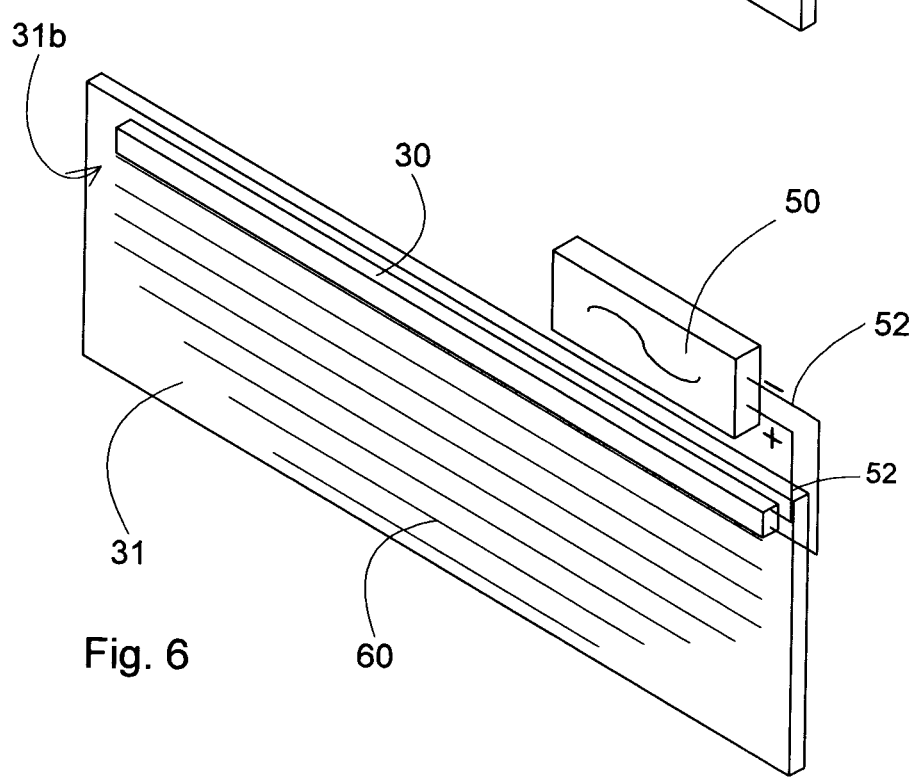
FIG. 6 is an isometric view schematic illustration of an exemplary cube-shaped ultrasound transducer built into or attached to a windshield side face, according to the present invention.

FIG. 6 is a isometric view schematic illustration of an exemplary cube-shaped ultrasound transducer 30 built into or attached to a windshield side face 31b, according to the present invention.

The cube-shaped ultrasound transducer 30 connects to an alternating current (AC) power supply 50 using at least two electrical conductors 52. The AC power supply 50 generates alternating current (and voltage) that is transferred to the shaped ultrasound transducer 30 via the electrical conductors 52. Since the cube-shaped ultrasound transducer 30 is made of a piezoelectric material it begins to vibrate at the frequency of the alternating current generated by the AC power supply 50. These vibrations are transferred into the flat windshield 31 to generate ultrasonic waves 60 within the flat windshield 31.

The ultrasonic waves 60 propagate within the flat windshield 31 according to the ultrasound absorption coefficient of the glass and when absorbed in the glass, generate the heat required to deice or defrost the flat windshield 31.

The present figure depicts only one cube-shaped ultrasound transducer 30 for simplicity reasons, but there may be more than one cube-shaped ultrasound transducer 30 connected to more than one AC power supply 50.

Figure 7:
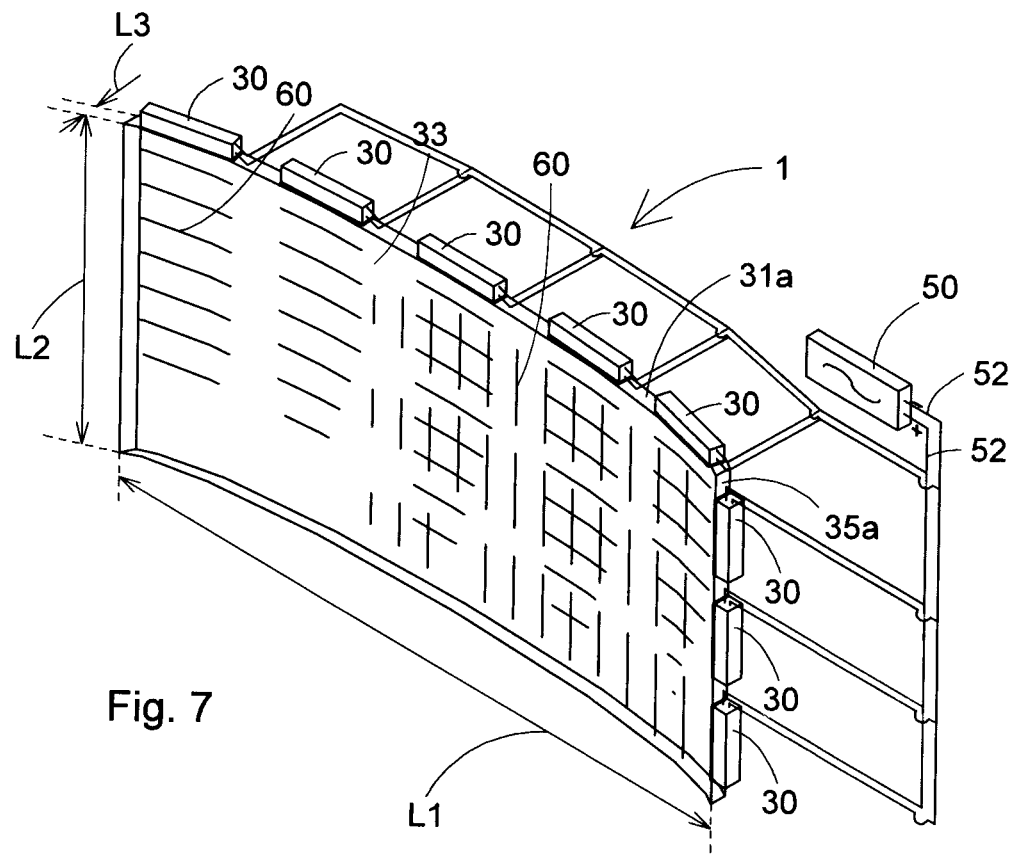
FIG. 7 is an isometric view schematic illustration of an exemplary deicing and defrosting ultrasound system arranged over car windshield side edges of a curved windshield, according to the present invention.

FIG. 7 is an isometric view schematic illustration of an exemplary deicing and defrosting ultrasound system 1 arranged over a car windshield side edges 31a, of a curved windshield 33, according to the present invention.

The deicing and defrosting ultrasound system 1 shown in the present illustration includes cube-shaped ultrasound transducers 30 with each of both adjacent windshield side edges 31a having several cube-shaped ultrasound transducers 30.

Each cube-shaped ultrasound transducer 30 connects to an alternating current (AC) power supply 50 using at least two electrical conductors 52, the present illustration shows only one AC power supply 50). The AC power supply 50 generates alternating current (and voltage) that is transferred to the shaped ultrasound transducer 30 via the electrical conductors 52.

The AC power supply 50, or several power supplies 50 with or without synchronization, is driven by the car electrical energy source, e.g. alternator or battery, or by an external energy source.

Each cube-shaped ultrasound transducer 30 generates waves 60 that are propagates through the curved windshield 33 and being absorbed by the curved windshield 33 material, or materials according to the ultrasound absorption coefficient of that material, or materials.

During design of a deicing and defrosting ultrasound system 1 including more than one cube-shaped ultrasound transducer 30, there is an advantage to considering the combined reciprocal effects of the vibrations of each one of the cube-shaped ultrasound transducers 30 on each one of the other cube-shaped ultrasound transducers 30.

The cube-shaped ultrasound transducer 30 can be connected to the windshield side edge 31a, also by means of attachment with epoxy glue 32.

The curved windshield 33 has windshield width L1, windshield height L2, and windshield thickness L3 dimensions, and when these are known, its area and volume can be easily calculated.

Figure 8:
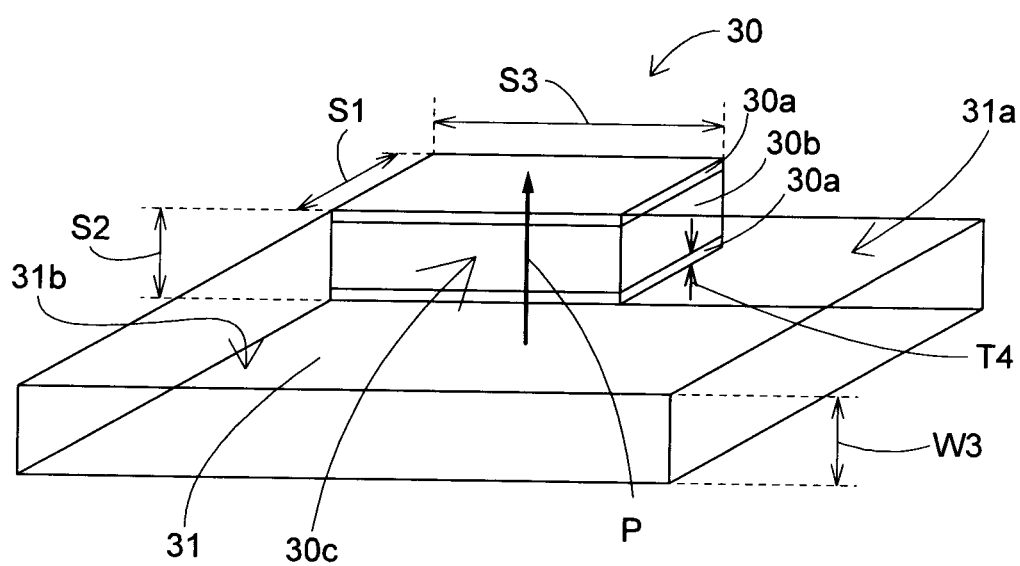
FIG. 8 is an isometric view schematic illustration of an exemplary cube-shaped ultrasound transducer connected to a windshield side edge, according to the present invention.

FIG. 8 is an isometric view schematic illustration of an exemplary cube-shaped ultrasound transducer 30 connected to windshield side edge 31a, according to the present invention.

The present invention is not limited to any specific type of ultrasound transducer, however, it has been found that cube-shaped ultrasound transducer 30 whose structure includes an ultrasound transducer body 30b, which is composed of ceramic material and two opposite sides of which have two ultrasound transducer external layers 30a, which are composed of an electrically conductive material, is highly effective.

Typical dimensions, which are in no way limiting the present invention, and which have been found as particularly effective for the Volkswagen Golf windshield structure, manufactured between 1999 and 2004 and with acoustic parameters described in Table 1, are of a cube measuring as follows:

a transducer depth S1 of 12 millimeters, a transducer height S2 of 5 millimeters, a transducer width S3 of 40 millimeters, and the ultrasound transducer external layer thickness S4, being significantly smaller than the other dimensions, of 10 micrometers.

The cube-shaped ultrasound transducer 30 according to the present invention also features at least one ultrasound transducer body side edge 30c, which is not coated with an ultrasound transducer external layer 30a.

The ultrasound transducer body 30b, according to the present invention, is composed of piezo ceramic material, which reacts to an electrical field conducting electrical energy to it. This reaction manifests in mechanical vibrations which are generated in the ceramic material. These vibrations create the ultrasound waves by transformation of electrical energy to vibrations The two ultrasound transducer external layers 30a, which are according to the present invention composed of a conductive material, serve as an electrical capacitor.

When a cube-shaped ultrasound transducer 30 according to the present invention is attached to windshield side edge 31a by means of a layer of epoxy glue 32 (not shown in the present drawing), and the cube-shaped ultrasound transducer 30 frequency F is 130 kilohertz, which is the ultrasonic wave 60 frequency F too, in this case, there is more than 95% efficiency of acoustic energy conduction from the cube-shaped ultrasound transducer 30 to the curved windshield 33.

According to the present invention the cube-shaped ultrasound transducer 30 is connected to the windshield side edge 31a by attaching the ultrasound transducer body side edge 30c, such that the ultrasound transducer polarization direction P is perpendicular to windshield side face 31b.

When the windshield is not flat, the perpendicularity is to windshield side face 31b at least in the area proximal to cube-shaped ultrasound transducer 30, with the term "proximal" applying to a distance of the same order of magnitude as the transducer depth S1.

It has been found that effective deicing and defrosting are achieved when the cube-shaped ultrasound transducer 30 frequency F is in the range between 120 kilohertz and 140 kilohertz, and that the power W, which is the output generated from the entire cube-shaped ultrasound transducer 30, is at least 100 Watt for every square meter of curved windshield 33, or flat windshield 31, having a windshield thickness L3 of 4.5 millimeters.

This output enables achieving a windshield temperature raising rate of at least DT at a rate of one degree centigrade for every minute.

Ice formation hampering ultrasound systems of the prior art using significantly lower outputs than the one given here. This is seeing as their function relies mostly on ice formation hampering of the windshield by means of the vibrations, with the temperature elevation rate significantly slower than the rate described here, and only secondary heat effect.

Figure 9:
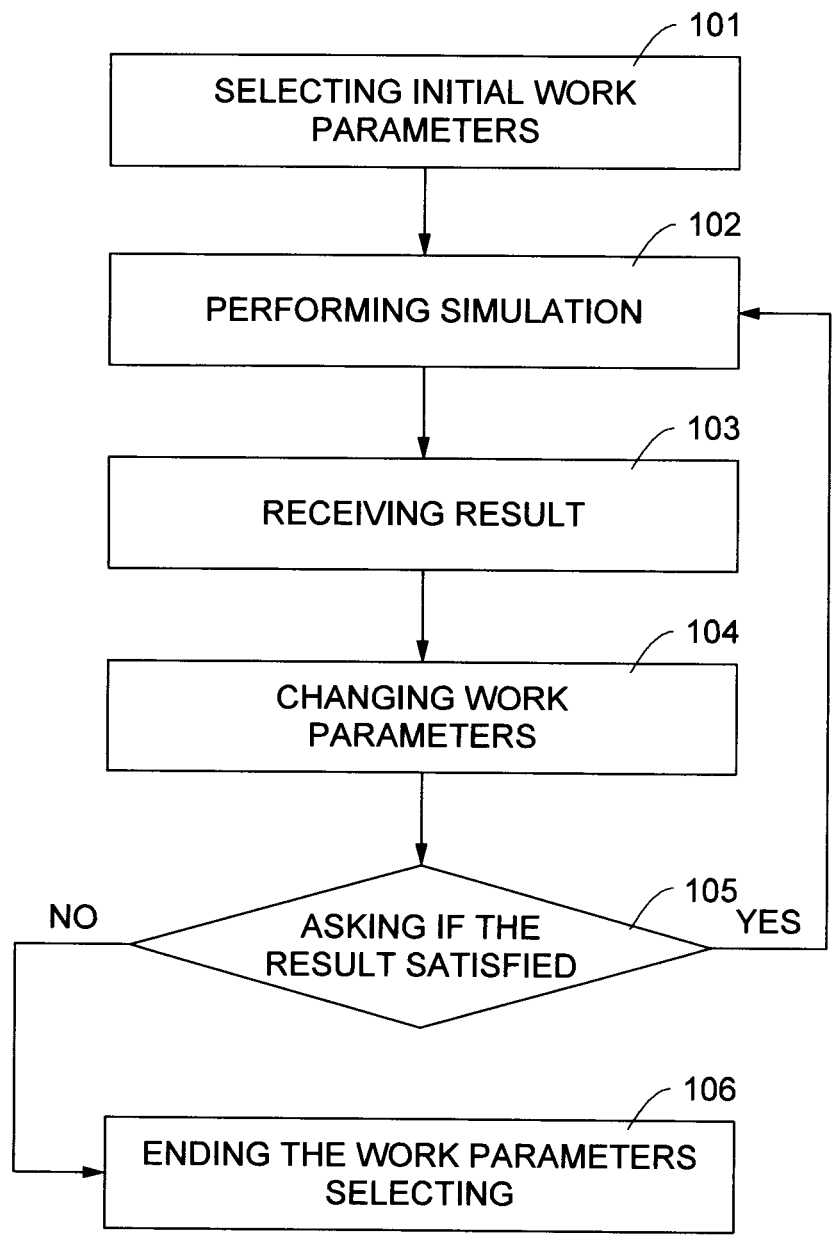
FIG. 9 is a flow chart that schematically illustrates a method for selecting work parameters of a deicing and defrosting ultrasound system, according to the present invention.

FIG. 9 is a flow chart that schematically illustrates a method for selecting work parameters of a deicing and defrosting ultrasound system, according to the present invention.

The work parameters are selected for a specific windshield. In order to create effective progression of the ultrasonic waves in a windshield having one or more layers, vibration mode should be selected, including a suitable frequency and ultrasound transducer shape. The waves must progress through the windshield for a distance of at least one meter in order to generate uniform heating. Vibrations were found to be absorbed mainly in layers of plastic, such as the windshield Polyvinyl Butyral (PVB) layer of the windshield, and are converted to heat. In order to allow the vibrations to be maintained for a distance, they must be generated so as not to be absorbed at a short range by the plastic. Essentially, a vibration mode should be generated to occur mostly in the glass layers of the windshield, and at a sufficiently low frequency to progress to the desired distance.

The method according to the present invention is based on a simulation of the deicing and defrosting ultrasound system, which is connected to a specific windshield, searching for vibrations that allow a predetermined distance of progress of the ultrasonic wave in the windshield, when the search parameters include the structure and shape of the cube-shaped ultrasound transducer (or an ultrasound transducer of a different shape), the ultrasound transducers 30 frequency, or frequencies, and the form of connection between each of the cube-shaped ultrasound transducer and the specific windshield.

Good practical results are achieved when the simulation is conducted for cube-shaped ultrasound transducers, and calculations are made for the transducer depth, height, and width, and the ultrasound transducer polarization direction. The simulation is first performed with initial working parameters. According to the results obtained, the working parameters are changed and an additional simulation is conducted, and so on, until a satisfactory result is achieved.

In the simulation, resistance and capacitance of the cube-shaped ultrasound transducer are calculated for a range of frequencies, based on specific index functions, the transducer depth, height, and width, and the ultrasound transducer polarization direction.

An example of an index function:

$$G \equiv \frac{A^4}{B \times C \times D \times E}$$

G is the index value, and the trend is to increase it as much as possible.

A is a geometrical vibration integral of the specific windshield at a given distance, such as half a meter, from a cube-shaped ultrasound transducer in the direction of the waves progression.

B is an integral of the movements in the adhesive layer between the cube-shaped ultrasound transducer to the windshield, with the trend being minimization of heating of the adhesive layer.

C is an integral of movement of the cube-shaped ultrasound transducer, with the trend being minimization of the heating of the cube-shaped ultrasound transducer.

D is the electrical resistance of the cube-shaped ultrasound transducer, with the trend being minimization of the resistance.

The method for selecting work parameters of a deicing and defrosting ultrasound system, according to the present invention includes the stages of:
- selecting initial work parameters of a cube-shaped ultrasound transducer, and of the frequency, (stage 101);
- performing simulation, (stage 102);
- receiving results, (stage 103);
- changing work parameters, (stage 104);
- asking if the result satisfied and receiving an answer, (stage 105);
- if the answer is 'no', returning to stage 102, and if the answer is 'yes', presiding to stage 106; and
- ending the work parameters selecting of one cube-shaped ultrasound transducer, and working frequency, (stage 106).

Figure 10:
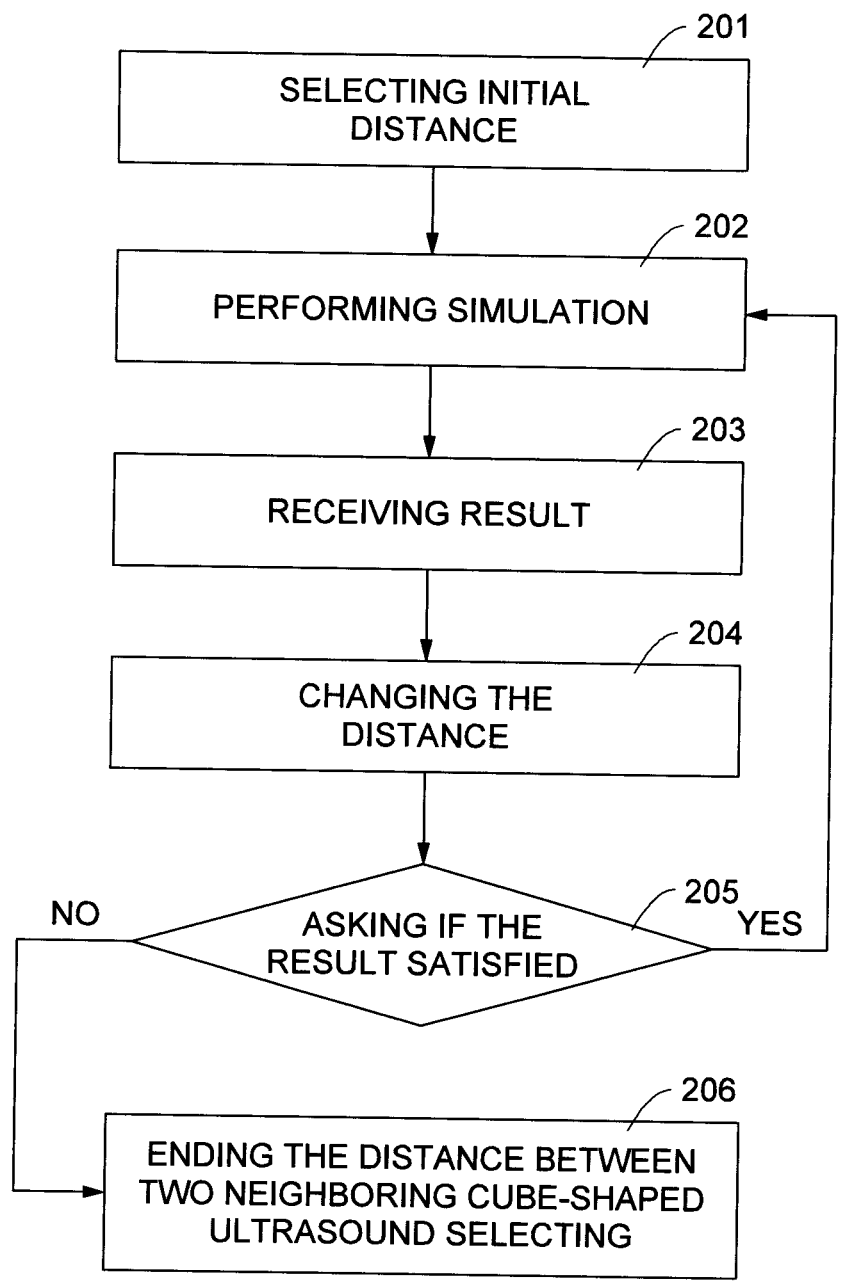
FIG. 10 is a flow chart that schematically illustrates a method for distance selecting between two neighboring cube-shaped ultrasound transducer of a deicing and defrosting ultrasound system, according to the present invention.

FIG. 10 is a flow chart that schematically illustrates a method for distance selecting between two neighboring cube-shaped ultrasound transducer of a deicing and defrosting ultrasound system, according to the present invention.

After selection of the working parameter of a single cube-shaped ultrasound transducer, a similar process is conducted in which the simulation takes into account the specifications of the specific windshield and the number of the cube-shaped ultrasound transducers of the deicing and defrosting ultrasound system is determined, as well as the point of connection of each one of them to a specific windshield.

The optimal distance between every two cube-shaped ultrasound transducers is calculated by finding the maximum of an index function, as was done for single cube-shaped ultrasound transducers.

The method for distance selecting between two neighboring cube-shaped ultrasound transducers of a deicing and defrosting ultrasound system includes the stages of:
- selecting initial distance between two neighboring cube-shaped ultrasound, (stage 201);
- performing simulation, (stage 202);
- receiving results, (stage 203);
- changing the distance, (stage 204);
- asking if the result satisfied and receiving an answer, (stage 205);
- if the answer is 'no', returning to stage 202, and if the answer is 'yes', presiding to stage 206; and
- ending the distance selecting between two neighboring cube-shaped ultrasound selecting, (stage 206).

Figure 11:
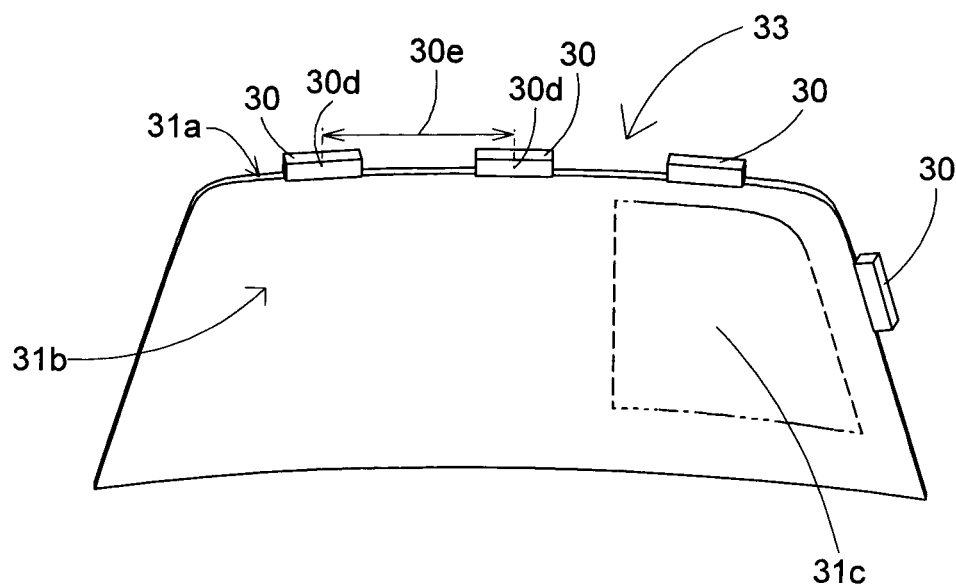
FIG. 11 is an isometric view schematic illustration of an exemplary curved windshield, which is connected to four cube-shaped ultrasound transducers, according to the present invention.

FIG. 11 is an isometric view schematic illustration of an exemplary curved windshield 33, which is connected to four cube-shaped ultrasound transducers 30, according to the present invention.

The four cube-shaped ultrasound transducers 30 are connected to two windshield side edge 31a, with the view toward the curved windshield 33 corresponding with a view from the inside of a car, namely, its side facing the viewer is a windshield side face 31b.

The glue attaching a cube-shaped ultrasound transducer 30 to a windshield side edge 31a is not shown in the present illustration.

The state shown in the illustration is a resting state with no production from the cube-shaped ultrasound transducer 30.

Each cube-shaped ultrasound transducer 30 has an ultrasound transducer center 30d. Between each two neighboring cube-shaped ultrasound transducers 30d there is a distance 30e, which is the shortest distance between both centers 30d.

According to the present invention, all the distances 30e can be identical or some are not identical, wherein the selection can be made based on the simulation results.

The bordered area represents a square meter of windshield area 31c of the windshield side face 31b.

Figure 12:
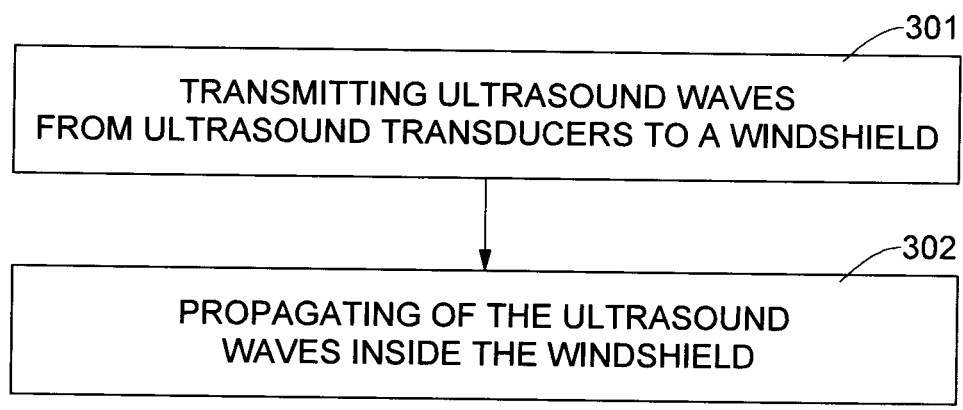
FIG. 12 is a flow chart that schematically illustrates a method for deicing of ice from a windshield, according to the present invention.

FIG. 12 is a flow chart that schematically illustrates a method for deicing of ice from a windshield, according to the present invention.

The method for deicing of ice from a windshield, according to the present invention includes the stages of:
- transmitting ultrasound waves from ultrasound transducers of a deicing and defrosting ultrasound system to the windshield, through a windshield side edge, wherein there is power generated from all of the cube-shaped ultrasound transducers and it is at least 100 watt for every square meter of the windshield, (stage 301); and
- propagating of the ultrasound waves inside the windshield, and wherein the ultrasound transducer polarization direction is perpendicular to a windshield side face, wherein there is a windshield temperature raising rate of at least ten degrees for every at least ten degrees per every 5 minutes, (stage 302).

Figure 13:
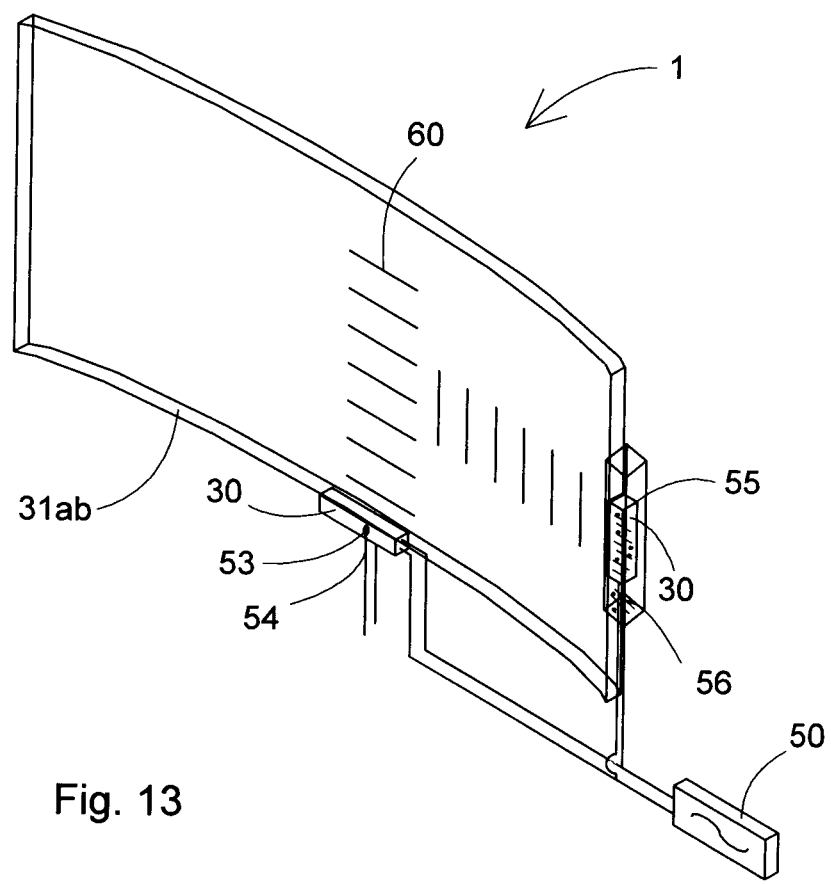
FIG. 13 is an isometric view schematic illustration of an exemplary deicing and defrosting ultrasound system arranged over a car windshield side edge, of a curved windshield, according to the present invention.

FIG. 13 is an isometric view schematic illustration of an exemplary deicing and defrosting ultrasound system 1 arranged over a car windshield side edges 31a, of a curved windshield 33, according to the present invention.

According to the present invention, use is made of much higher outputs than in the prior art, which can cause overheating of the cube-shaped ultrasound transducers 30 (or of an ultrasonic transducer of any other shape), the result of which can be burning of the cube-shaped ultrasound transducer 30 or the adhesive layer, even though it is working in a cold environment. A solution to the overheating problem can be with assistance of cooling, for example, cooling with liquid 56, such as oil or water.

In such a case, the cube-shaped ultrasound transducer 30 is within container 55, which also contains liquid 56.

This cooling can also be achieved by running water melted from the ice on the windshield when the cube-shaped ultrasound transducer 30 is connected at the windshield bottom side edge 31ab and the water is flowing toward it.

To prevent damage such as burning a cube-shaped ultrasound transducer 30, or other damage as a result of the cube-shaped ultrasound transducer 30 overheating, it can be connected to heat sensor 53, which is connected to wires 54, enabling automatic deactivation of the cube-shaped ultrasound transducer 30 when it reaches a certain temperature threshold.

While the invention has been described with respect to a limited number of embodiments, it will be appreciated that many variations, modifications and other applications of the invention may be made.

What is claimed is:

1. A deicing and defrosting ultrasound system for deicing and defrosting ice from a windshield, wherein the windshield has windshield side edges and two windshield side faces, the system comprising:
   (a) at least one ultrasonic transducer assembled onto said windshield side edges; and
   (b) at least one alternating current (AC) power supply, wherein each one of said ultrasonic transducer is operatively connected to one of said power supplies, wherein there is a power generated from all of said ultrasound transducers wherein said power is at least 100 watt for every windshield square meter area.

2. The deicing and defrosting ultrasound system of claim 1, wherein each one of said at least one ultrasound transducer is a cube-shaped ultrasound transducer.

3. The deicing and defrosting ultrasound system of claim 2, wherein each one of said cube-shaped ultrasound transducers includes:
 (i) an ultrasound transducer body having six ultrasound transducer body side edges; and
 (ii) two ultrasound transducer external layer disposed on two opposite sides of said ultrasound transducer body side edges.

4. The deicing and defrosting ultrasound system of claim 3, wherein said ultrasound transducer body is composed of ceramic material and wherein said ultrasound transducer external layer are composed of an electrically conductive material.

5. The deicing and defrosting ultrasound system of claim 4, wherein each one of said cube-shaped ultrasound transducer is assembled onto said windshield side edges such that one ultrasound transducer body side edge which is not coated with said ultrasound transducer external layer are faced to one of said windshield side edges.

6. The deicing and defrosting ultrasound system of claim 4, wherein said ultrasound transducer is built into said windshield's structure.

* * * * *